Jan. 20, 1925.

B. R. BENJAMIN

KNOTTER HOOK

Filed May 16, 1923

1,523,471

Inventor:
Bert R. Benjamin,
By W. P. Doolittle
Atty

Patented Jan. 20, 1925.

1,523,471

UNITED STATES PATENT OFFICE.

BERT R. BENJAMIN, OF OAK PARK, ILLINOIS, ASSIGNOR TO INTERNATIONAL HARVESTER COMPANY, OF CHICAGO, ILLINOIS, A CORPORATION OF NEW JERSEY.

KNOTTER HOOK.

Application filed May 16, 1923. Serial No. 639,245.

*To all whom it may concern:*

Be it known that I, BERT R. BENJAMIN, a citizen of the United States, residing at Oak Park, in the county of Cook and State of Illinois, have invented certain new and useful Improvements in Knotter Hooks, of which the following is a full, clear, and exact specification.

This invention relates to a knotter hook particularly adapted for use in connection with a knotter mechanism for grain binders and the like.

These knotter hooks, as usually made, comprise a shank or shaft portion, the lower end of which is formed with an integral non-movable hook portion. Pivoted to this hook is the usual movable jaw. The shaft is journaled near its hook end in a bracket, which, as usual, is of steel or iron. This bracket is carried by the knotter breast plate and carries a pinion at its free end, and, in this manner, rotation is imparted to the hook in operation. It has been found that the cold rolled steel, of which this shaft must be made to obtain the necessary strength and rigidity, does not provide a good bearing surface for rotation in the bracket mentioned.

Considerable difficulty has also been experienced by farmers who carelessly leave their grain binders out in the fields without any shelter from the destructive elements of the weather and in many such cases where the binders have thus been subjected to these conditions, the knotter mechanism, particularly the knotter hook, has become rusted making the knotter mechanism practically inoperative and in numerous cases requiring a new knotter hook to replace the rusted one.

To overcome these objections, I have provided a construction of knotter hook which will not corrode when subjected to weather conditions and one which is provided with a bearing portion surrounding the knotter hook shaft at its hook end, said portion being of anti-friction bearing metal different from that of the shaft, whereby frictional contact of the shaft in the bracket is reduced to a minimum.

A further object is to provide a novel configuration formed on a comparatively small shaft which permanently secures and retains a separate die-cast hook to the same, the joined parts being so formed that end slipping of the hook off the shank or rotation of the hook thereon is impossible.

A still further object is to provide a two-piece knotter hook in which the hook is die-cast on the shaft in a manner to form the bearing surface above mentioned.

These and other objects are attained by a construction and arrangement of the various elements in the manner hereinafter described and particularly pointed out in the appended claims.

Referring to the drawings—

Figure 1:
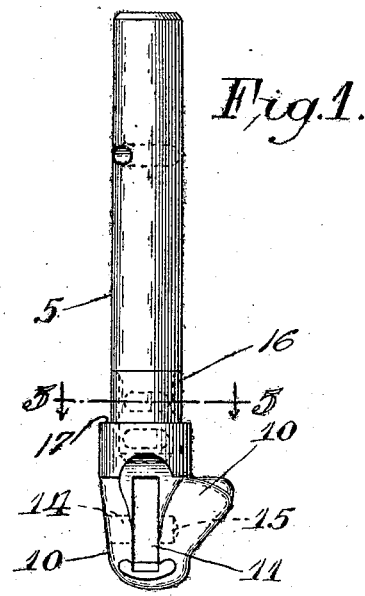
Fig. 1 is a front elevational view of my improved knotter hook.
Figure 2:
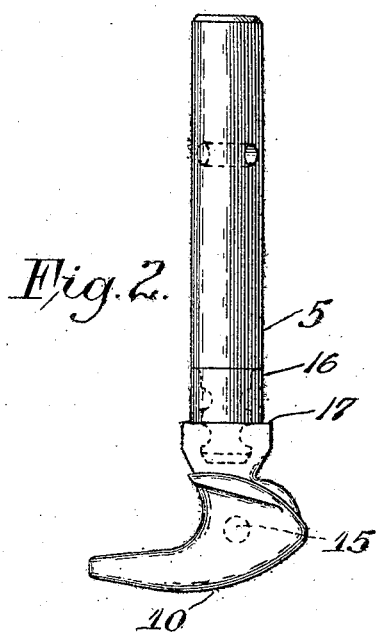
Fig. 2 is a side elevational view of Fig. 1.
Figure 3:
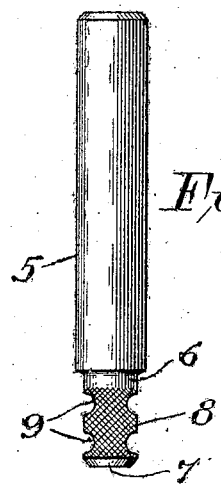
Fig. 3 is a side elevational view of the knotter shaft showing the manner in which one end of the same is knurled and grooved.
Figure 4:
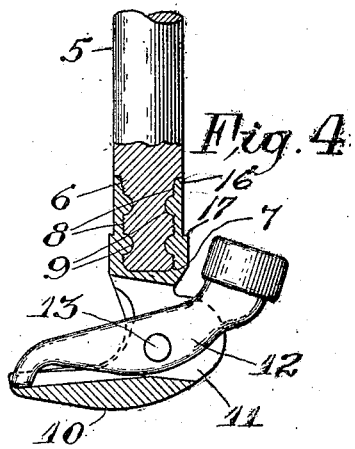
Fig. 4 is a side elevational view partly in section showing the manner in which the hook is die-cast on the shaft.
Figure 5:
Fig. 5 is a sectional view taken along the line 5—5 of Fig. 1.

My improved knotter hook here shown is preferably made of a cold rolled shaft 5 having one end thereof turned down to a relatively smaller diameter as shown at 6, this smaller diametral portion having its lower end thereof beveled off at substantially 45 degrees as shown at 7. The peripheral surface of the smaller diametral portion is knurled in the manner shown at 8. In addition to the knurled peripheral surface, I have provided a plurality of oppositely arranged grooves 9 disposed non-concentrically to the longitudinal axis of the shaft. Preferably a plurality of longitudinally spaced sets of these grooves is provided. By this construction or novel configuration of the lower end of the shaft 5, I have provided means for securely die-casting a hook of non-corrosive metal to the shaft and one that functions under all weather conditions in a manner superior to the present knotter hooks now in use. The shaft 5 with the configuration formed on the lower end as above described, is then placed into a die-casting machine and a hook 10 is die-cast on the same as shown in Figures 1, 2 and 4 of the drawing, the metal flowing along the shaft and around the configurations and knurling to form a bearing surface 16 for cooperation with the usual supporting bracket, not shown, which bracket or frame abuts a shoulder 17 formed with the bearing 16 during the die-casting operation. This bearing 16 being of a composition of brass or an alloy containing copper, or any well known non-corrosive bearing metal, provides a good anti-friction surface and a durable bearing portion for the steel shaft. The hook thus cast to the shaft becomes securely fixed thereto by reason of the metal filling the grooves 9 and engaging the knurls 8. It will also be noted as a result of this process of die-casting the hook to the shaft, with the molten metal entirely surrounding the reduced portion 6 of the shaft 5, that when the same cools it shrinks and thus permanently becomes secured to the shaft. The hook 10 is formed with a transversely extending slot 11 which is adapted to operatively receive a tongue 12 pivotally mounted on a pin 13. The pin 13 extends through an aperture 14 on one side of the hook 10 into a socket 15 formed on the other side of the hook 10. It is, of course, understood that the tongue 12 is also made of non-corrosive or non-rusting metals.

From the above description, it will be seen that I have provided a novel construction and arrangement of a knotter hook. With a hook of this construction, the elements of the weather do not impair the operation of the tongue in the knotter hook as heretofore experienced by knotter hooks employed in the knotting mechanism of grain harvesters.

In the above specification, I have described but one embodiment which my invention may assume in practice, but it will be understood that modification may be made from this construction without departing from the spirit and scope of my invention as expressed in the following claims.

What I claim as my invention and desire to secure by Letters Patent is:

1. A knotter hook for a knot tying mechanism comprising a shaft, and a hook member cast over the end of the shaft, a portion of the hook member being formed around and along a part of the shaft to form a bearing surface thereon.

2. A knotter hook for a knot tying mechanism comprising a shaft, a reduced extension on one end of the shaft, a hook member cast on the shaft and having a portion formed over the extension and flush with the main surface of the shaft whereby a bearing surface is provided on the shaft.

3. A knotter hook for a knot tying mechanism comprising a shaft, a reduced extension on one end of the shaft, a hook member of non-corrosive metal cast over the shaft and having a portion formed over the extension and flush with the shaft where it is reduced, whereby a bearing surface of the same material as the hook is provided on the end of the shaft.

4. A knotter hook for a knot tying mechanism comprising a shaft, a reduced extension on one end of the shaft, grooves in the extension non-concentrically arranged with respect to the axis of said shaft, and a hook member rigidly formed over the extension and grooves.

5. A knotter hook for a knot tying mechanism comprising a shaft, a reduced extension on one end of the shaft, a longitudinally spaced series of diametrically opposed non-concentric grooves in the extension, and a hook member rigidly formed over the extension and grooves and flush with the shaft where it is reduced.

6. A knotter hook for a knot tying mechanism comprising a shaft, and a hook member of non-corrosive metal rigidly formed over the end of the shaft, a portion of the hook member being formed around and along a part of the shaft to provide an anti-frictional bearing surface thereon.

7. A knotter hook having a hard metal strain resisting shaft, a separate hook member of non-corrosive, bearing metal cast on the end of the shaft and having a longitudinal extension on the shaft to provide a bearing surface for the shaft.

8. A knotter hook for a knot tying mechanism comprising a shaft having a reduced and non-concentrically grooved extension, and a hook member of non-corrosive metal formed over the reduced end of the shaft, a portion of the hook member being formed around and along a part of the shaft to provide an anti-frictional bearing surface thereon.

9. A knotter hook for a knot tying mechanism comprising a shaft adapted to be journaled in the knotter frame, a reduced extension on one end of the shaft, a hook member formed on the reduced extension and providing a bearing portion at said end of the shaft, and a shoulder at one end of the bearing portion adapted to abut the frame.

In testimony whereof I affix my signature.

BERT R. BENJAMIN.